United States Patent [19]

Meginnis

[11] 3,922,999

[45] Dec. 2, 1975

[54] SIGHT GLASS WITH WEAR INDICATING DEVICE

[76] Inventor: Charles E. Meginnis, 529 1/2 Nancy St., Charleston, W. Va. 25302

[22] Filed: Nov. 2, 1973

[21] Appl. No.: 412,255

[52] U.S. Cl........ 116/114 Q; 23/230 C; 116/117 C; 138/36

[51] Int. Cl.² ............... G01D 13/00; G01D 11/26; G01N 31/00

[58] Field of Search........ 116/114 Q, 117 R, 117 C; 138/36; 285/16; 220/82 A; 73/323, 334, 331, 73/86; 188/1 A; 137/559, 329; 23/230 C, 253 C; 222/154, 157, 159

[56] References Cited
UNITED STATES PATENTS

| | | | |
|---|---|---|---|
| 1,975,832 | 10/1934 | De Florez | 137/36 |
| 2,102,784 | 12/1937 | Bridges | 116/114 Q X |
| 2,233,403 | 3/1941 | Dickinson et al. | 138/36 X |
| 2,917,924 | 12/1959 | Messick | 73/334 |
| 3,014,788 | 12/1961 | Littler et al. | 23/253 C |
| 3,251,335 | 5/1966 | Dannevic | 116/117 R |
| 3,261,388 | 7/1966 | Kovac et al. | 116/114 Q X |
| 3,307,400 | 3/1967 | LeRoy | 116/117 |
| 3,352,149 | 11/1967 | Sherlock et al. | 73/86 |
| 3,621,810 | 11/1971 | Zuck, Jr. | 23/253 C |
| 3,854,885 | 12/1974 | Fromm et al. | 137/559 |

*Primary Examiner*—Richard C. Queisser
*Assistant Examiner*—Daniel M. Yasich
*Attorney, Agent, or Firm*—Mason, Fenwick & Lawrence

[57] ABSTRACT

A means for detecting wear of the exposed surface of a transparent member such as a sight glass, forming at least a portion of the wall of an enclosure such as a vessel or a conduit, containing a fluid capable of physically or chemically attacking such exposed surface, generally comprising a nontransparent means disposed on the transparent member on a line of sight therethrough, which when worn away either by physical or chemical action of the fluid will indicate that the exposed surface of the transparent member has worn away a predetermined amount.

10 Claims, 5 Drawing Figures

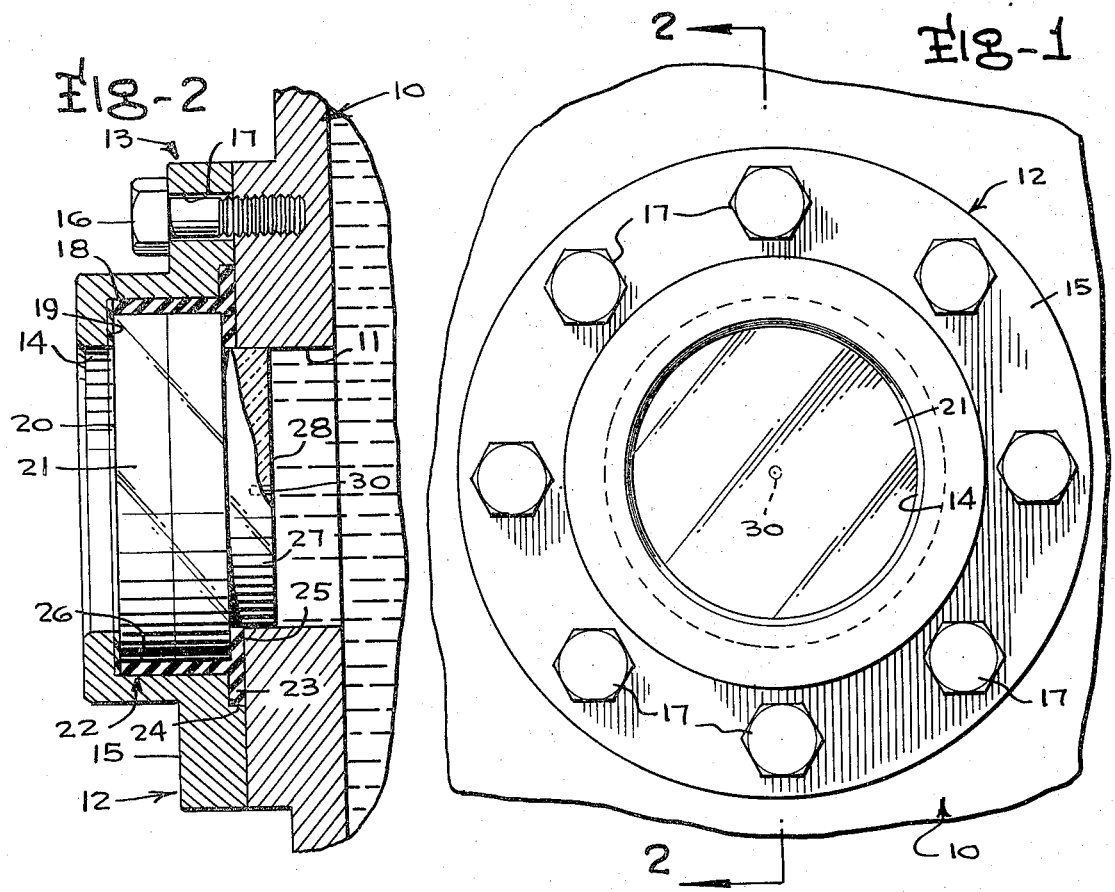
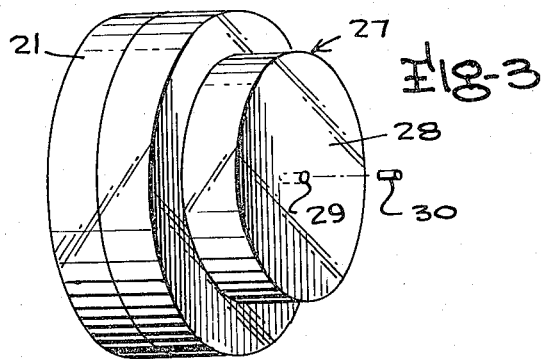
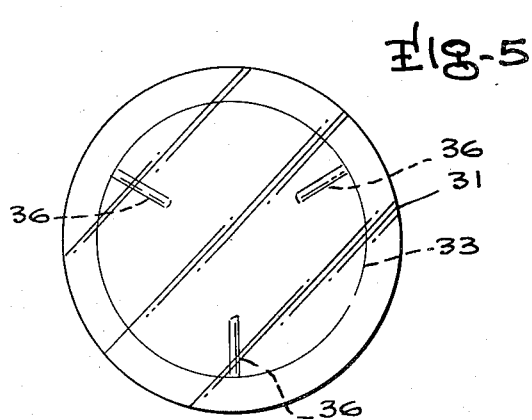
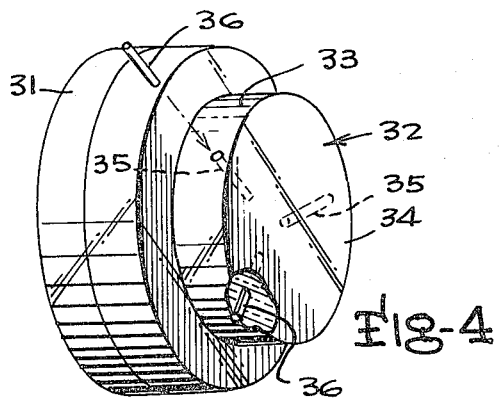

SIGHT GLASS WITH WEAR INDICATING DEVICE

This invention relates to a sight glass and more particularly to a sight glass adapted for use on vessels or conduits containing fluid capable of wearing away the inner surface of such sight glass either by physical or chemical action, having means for detecting such erosion and/or corrosion.

In the chemical and other processing industries, sight glasses commonly are used for viewing the interiors of vessels or conduits containing fluids. Such sight glasses usually are formed of tempered glass or clear plastic and are mounted on a vessel or conduit across an opening therein. Often, over an extended period of service, the fluid within the vessel or conduit will erode or corrode the exposed surface of the sight glass thereby weakening the sight glass which could cause a failure and possibly even a blowout of the glass, depending on the amount of interior surface worn away by the fluid and the pressure of the fluid within the vessel or conduit.

In the prior art, in order to inspect a sight glass subject to such erosion or corrosion to determine whether the condition of such a glass presents a safety hazard, it has been the conventional practice to remove the vessel or conduit from operation, disassemble the sight glass assembly to permit inspection of the sight glass, and then reassemble the sight glass assembly on the vessel or conduit. Often times when such inspections are conducted during routine preventive maintainance procedures, the sight glass is found to be in satisfactory condition which then results in the needless interruption of the vessel or conduit and correspondingly in a loss of production time. It thus has been found desirable to provide a means for determining when a sight glass mounted on a vessel or conduit has been worn sufficiently to constitute a safety hazard, and thus require replacement, which will minimize loss in production time in the operation of the vessel or conduit.

Accordingly, it is the principal object of the present invention to provide a novel sight glass.

Another object of the present invention is to provide a novel sight glass mountable on a vessel or conduit containing a fluid for viewing the interior of such vessel or conduit.

A further object of the present invention is to provide a novel sight glass mountable on a vessel or conduit containing a fluid capable of wearing an exposed surface thereof either by physical or chemical action, having means for determining when the sight glass has been worn a predetermined amount.

A still further object of the present invention is to provide a novel sight glass mountable across an opening in the wall of a vessel or conduit containing a fluid capable of eroding or corroding an exposed surface thereof, having means for detecting a predetermined amount of wearing of such exposed surface without requiring the dismantling of the sight glass from the vessel or conduit.

Another object of the present invention is to provide a novel sight glass mountable across an opening in the wall of a vessel or conduit containing a fluid capable of eroding or corroding an exposed surface thereof, for viewing the interior of such a vessel or conduit, having means for detecting visually a predetermined amount of wear of such exposed surface.

A further object of the present invention is to provide a novel sight glass mountable across an opening in the wall of a vessel or conduit containing a fluid capable of eroding and/or corroding an exposed surface thereof, having means for detecting a predetermined amount of wear of such exposed surface, which is comparatively simple in construction, relatively inexpensive to manufacture, and highly reliable in performance.

Other objects and advantages of the present invention will become more apparent to those persons having ordinary skill in the art to which the present invention pertains from the following description taken in conjunction with the accompanying drawing in which:

FIG. 1 is a front elevational view of a sight glass assembly mounted on a vessel containing a fluid, utilizing an embodiment of the invention;

FIG. 2 is a cross-sectional view taken along line 2—2 in FIG. 1;

FIG. 3 is a perspective view of the embodiment of the invention shown in FIGS. 1 and 2, illustrating a portion thereof in exploded relation;

FIG. 4 is a perspective view of a second embodiment of the invention; and

FIG. 5 is a front elevational view of the second embodiment of the invention.

Briefly described, the present invention relates to a means for detecting a predetermined amount of wear of an exposed surface of a transparent member such as a sight glass, forming at least a portion of a wall of an enclosure or conduit containing a fluid capable of physically or chemically attacking the exposed surface of the sight glass, generally including a nontransparent means disposed on the transparent member on a line of sight therethrough which when worn away either by physical or chemical action of the fluid will indicate that the exposed surface of the transparent member has worn away a predetermined amount. In the preferred embodiment of the invention, the exposed surface of the transparent member includes a recess and the nontransparent member consists of an insert disposed within such recess, which insert is opaque and is formed of a material having substantially the same wear characteristics as the material of the transparent member.

Referring to FIGS. 1 through 3 of the drawing, there is illustrated a fluid vessel 10, having a circular opening 11 therein and a sight glass assembly 12 secured to the fluid container across the opening 11. The sight glass assembly includes a housing structure 13 having an opening 14 adapted to register with the opening 11 in the fluid vessel, and an annular flange portion 15. The housing structure is secured to the fluid vessel 10 by means of a plurality of bolts 16 extending through suitable openings 17 circumferentially spaced in the annular flange portion 15, which are adapted to register with suitable threaded holes in the fluid vessel. The opening 14 in the housing structure is provided with an enlarged section 18 which provides an annular shoulder 19. Mounted on the shoulder 19 is a gasket 20 and a circular sight glass 21 having a diameter less than the diameter of the enlarged section 18. Disposed within the enlarged section 18 is an insert 22 having an outwardly extending annular flange portion 23 extending into an annular recess 24 at the end of the enlarged section 18, an inwardly extending annular flange portion 25 which provides an annular seat for the sight glass 21, and an annular portion 26 disposed within the enlarged section 18 and interposed between the housing structure 12 and the periphery of sight glass 21.

The insert 22 may consist of any inert or corrosive resistant material. The material should be suitable so as not to react with the housing structure which would normally be formed of a metallic material, or any corrosive gases or liquids contained within the fluid vessel 10. It is preferred that the insert 22 be formed of a material such as Teflon. The insert also can be constructed from a noncorrosive metal such as stainless steel and titanium. The principal purpose of the insert 22 is to shield the sight glass 21 from the housing structure and also to shield the housing structure from the interior of the fluid vessel 11, and does not form a part of the present invention.

The sight glass 21 may be formed from glass, preferably tempered glass, or a clear plastic, and is provided with a portion 27 of reduced diameter which is adapted to be received within the opening 11 of the vessel 10, as best illustrated in FIG. 2. The reduced portion 27 of the sight glass is provided with a surface 28 which is exposed to the fluid within the vessel 10. As best illustrated in FIG. 3, the exposed surface is provided with a recess 29 in which there is disposed an insert 30. Preferably, the length of the insert 30 is the same dimension as the depth of the recess 29 so that the exposed face of the insert 30 is disposed flush with the exposed surface 28. The depth of the recess 29 is of a predetermined amount depending on the amaount of wear of the exposed surface 28 sought to be detected. The insert 30 is of a nontransparent color, and preferably opaque, and is either press fit or bonded in the recess 29. In addition, the material from which the insert 30 is formed, preferably has the same wear characteristics as the material from which the sight glass 21 is formed.

In the conventional use of the sight glass assembly as illustrated in FIG. 2, under conditions where the fluid within the vessel 10 is corrosive in nature and possibly maintained under pressure, over an extended period of service, the fluid will chemically attack the exposed surface 28 of the sight glass and gradually wear such surface away and thus weaken the sight glass. Usually, the wear on the exposed surface 28 occurs as a result of erosion, corrosion or a combination of erosion and corrosion. Whenever the exposed surface 28 of the sight glass becomes worn sufficiently and the pressure within the vessel 11 is great enough, the sight glass will be caused to fracture and possibly even blowout, thereby creating a serious safety hazard. In order to prevent such an occurrence, in the normal course of preventive maintainance, the vessel 11 is taken out of service, the sight glass assembly is dismantled to permit inspection of the exposed surface 28 of the sight glass, the sight glass is replaced if the glass has worn too thinly, the sight glass assembly is then replaced on the vessel wall, and the vessel is placed back in service.

Often times during such normal inspection procedures, the sight glass is found to be in proper condition for additional use which then renders the disassembly and reassembly of the sight glass unit, an unavoidable but nonproductive routine which results in a loss of production time. The present invention permits the detection of a dangerously worn exposed surface 28 of the sight glass merely by looking through the sight glass to ascertain whether the nontransparent insert 29 is still visible. As long as the insert 29 is visible, maintainance personnel would readily determine that the exposed surface of the sight glass has not worn a sufficient amount to necessitate replacement. However, whenever the insert 29 is no longer visible, then maintainance personnel will be alerted to the fact that the exposed surface 28 of the sight glass has worn a sufficient amount to render the sight glass unsafe for further operation. Under such circumstances, the vessel 11 can be taken out of service and the sight glass can be replaced without otherwise having to do so needlessly.

FIGS. 4 and 5 illustrate another embodiment of the invention which similarly includes a sight glass 31 having a portion 32 receivable within the opening 11 in the vessel wall, provided with an annular surface 33 and an exposed surface 34. The annular surface 33 of portion 32 is provided with circumferentially spaced, radially extending recesses 35 which are adapted to receive inserts 36. The recesses 35 are disposed a predetermined distance from the exposed surface 34 which corresponds to the amount of sight glass which safely can be worn away before the thickness of the sight glass is reduced to a critical dimension with some margin of safety allowed. The inserts 36 similarly to the insert 30 are nontransparent and preferably opaque, and preferably consist of a material having the same wear characteristics as the material of the sight glass 31. The inserts 36 also may be press fit or bonded within the recesses 35.

The embodiment illustrated in FIGS. 4 and 5 is adapted to function in a manner similar to the embodiment shown in FIGS. 1 through 3 to indicate when the exposed surface 34 of sight glass 31 has worn a predetermined amount. It will be seen that in the use of the sight glass illustrated in FIGS. 4 and 5, whenever the inserts 35 are visible, it can be determined that the thickness of the sight glass 31 is sufficient to permit the continued use of the sight glass in service. However, whenever the exposed surface 34 and the inserts 36 have become sufficiently worn by the physical and/or chemical action of the fluid within the vessel so that the inserts 35 also have been worn away and are not longer visible, then maintainance personnel will be alerted to the fact that the thickness of the sight glass 31 has been reduced to a critical dimension and should be replaced.

As previously mentioned, it is preferred that the inserts 30 and 36 should be formed of a material having the same wear characteristics as the sight glasses with which they are used. In this regard, it will be noted that if the inserts have different wear characteristics than the sight glasses with which they are used, it is conceivable that the sight glasses may wear at a greater or lesser rate than the inserts thereby impairing the wear detecting functions of the inserts unless appropriate compensation is made for any differences in wear characteristics of the two materials.

In addition to the use of solid inserts in the recesses provided in the sight glasses of the aforementioned embodiments, it further is contemplated that the inserts merely can be provided with a coating material which would be visible to operating personnel looking through the sight glasses. If such a coating were used, it again would be desirable to use a coating having the same wear characteristics as the material from which the sight glasses are formed.

From the foregoing detailed description, it will be evident that there are a number of changes, adaptations and modifications of the present invention which come within the province of those skilled in the art. However, it is intended that all such variations not departing from the spirit of the invention be considered within the scope thereof as limited solely by the appended claims.

I claim:

1. In an enclosure containing a fluid and having an opening therein, a structure for viewing the interior of said enclosure comprising a sight glass mounted on said enclosure across such opening therein providing a surface exposed to the interior of said enclosure, said sight glass including means for detecting wear of said exposed surface consisting of nontransparent means preselected dimemsions inserted in said exposed surface of said sight glass on a line of sight therethrough, said sight glass, which when worn away either by physical or chemical action of said fluid, will cause said wear detecting means to indicate that the exposed surface of said sight glass has worn away a predetermined amount.

2. A structure according to claim 1 wherein said nontransparent means is opaque.

3. A structure according to claim 1 wherein said nontransparent means is formed of a material having substantially the same wear characteristics as the material of said sight glass.

4. A structure according to claim 1 wherein said exposed surface includes a recess and said nontransparent means comprises an insert disposed within said recess.

5. A structure according to claim 4 wherein said insert is opaque.

6. A structure according to claim 4 wherein said insert is formed of a material having substantially the same wear characteristics as the material of said sight glass.

7. A structure according to claim 1 wherein said sight glass is provided with a side wall having a recess disposed a predetermined distance from said exposed surface, and wherein said nontransparent means comprises an insert disposed with said recess.

8. A structure according to claim 7 wherein said recess is disposed substantially transversely relative to a line of sight through said sight glass.

9. A structure according to claim 7 wherein said insert is opaque.

10. A structure according to claim 7 wherein said nontransparent means is formed of a material having substantially the same wear characteristics as the material of said sight glass.

* * * * *

UNITED STATES PATENT AND TRADEMARK OFFICE
CERTIFICATE OF CORRECTION

PATENT NO. : 3,922,999
DATED : December 2, 1975
INVENTOR(S) : Charles E. Meginnis It is certified that error appears in the above-identified patent and that said Letters Patent are hereby corrected as shown below:

Column 3, line 29, "amaount" should be --amount--.

Claim 1, line 7, insert --of-- after "means".

Claim 1, line 8, "dimemsions" should be --dimensions--.

Signed and Sealed this second Day of March 1976

[SEAL]

Attest:

RUTH C. MASON
Attesting Officer

C. MARSHALL DANN
Commissioner of Patents and Trademarks